United States Patent
Kwon (10) Patent No.: US 7,269,451 B2
(45) Date of Patent: Sep. 11, 2007

(54) METHOD AND SYSTEM FOR A SLIDE TYPE PORTABLE TERMINAL

(75) Inventor: Soon-Sung Kwon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/019,813

(22) Filed: Dec. 20, 2004

(65) Prior Publication Data
US 2005/0136698 A1    Jun. 23, 2005

(30) Foreign Application Priority Data
Dec. 20, 2003   (KR)   ............... 10-2003-0094283

(51) Int. Cl.
    *H04M 1/00* (2006.01)
(52) U.S. Cl. ............... 455/575.4; 455/575.1
(58) Field of Classification Search ............ 455/575.4, 455/90.3, 550.1; 361/727; 267/156; 379/433
See application file for complete search history.

(56) References Cited

U.S. PATENT DOCUMENTS

| | | | |
|---|---|---|---|
| 5,719,935 A | 2/1998 | Ma | |
| 6,733,005 B2* | 5/2004 | Kauhaniemi et al. | 267/156 |
| 6,822,871 B2* | 11/2004 | Lee et al. | 361/727 |
| 2001/0044320 A1* | 11/2001 | Ono et al. | 455/550 |
| 2005/0079902 A1* | 4/2005 | Chen et al. | 455/575.4 |

FOREIGN PATENT DOCUMENTS

| EP | 1 496 674 A2 | 1/2005 |
|---|---|---|
| WO | WO99/43135 | 8/1999 |

\* cited by examiner

*Primary Examiner*—Lester G. Kincaid
*Assistant Examiner*—Charles Shedrick
(74) *Attorney, Agent, or Firm*—Lee, Hong, Degerman, Kang & Schmadeka (57) ABSTRACT

A system and method is disclosed for slide type portable terminal. The system comprises a first body removably attached to a second body, and a magnetic mechanism for adjusting a relative position of the first body to the second body. The first body applies a magnetic driving force to the second body, when the first body is in an open position in relation to the second body.

31 Claims, 11 Drawing Sheets

METHOD AND SYSTEM FOR A SLIDE TYPE PORTABLE TERMINAL

CROSS-REFERENCE TO RELATED APPLICATIONS

Pursuant to 35 U.S.C. § 119(a), this application claims the benefit of earlier filing date and right of priority to Korean Application No. 10-2003-0094283, filed on Dec. 20, 2003, the contents of which are hereby incorporated by reference herein in its entirety.

BACKGROUND OF THE INVENTION

1. Field of the Invention

The present invention relates to a slide type portable terminal and, more particularly, to a system and method for a slide type portable terminal opening and closing using a magnetic force.

2. Description of the Related Art

Portable terminals come in many types. A flip type portable terminal comprises an input button region rotatably mounted to a terminal body for exposing or hiding the input button region. A folder type portable terminal comprises a body unit having a dial button, a menu button, etc . . . and a folder unit rotatably mounted to the body having a liquid crystal display (LCD), etc. A slide type portable terminal comprises a body having a LCD display for displaying information, and a cover for a user to input information. The LCD display for the slide type portable terminal provides a larger viewing screen for a user than conventional folder type and flip type portable terminals.

Figure 1:
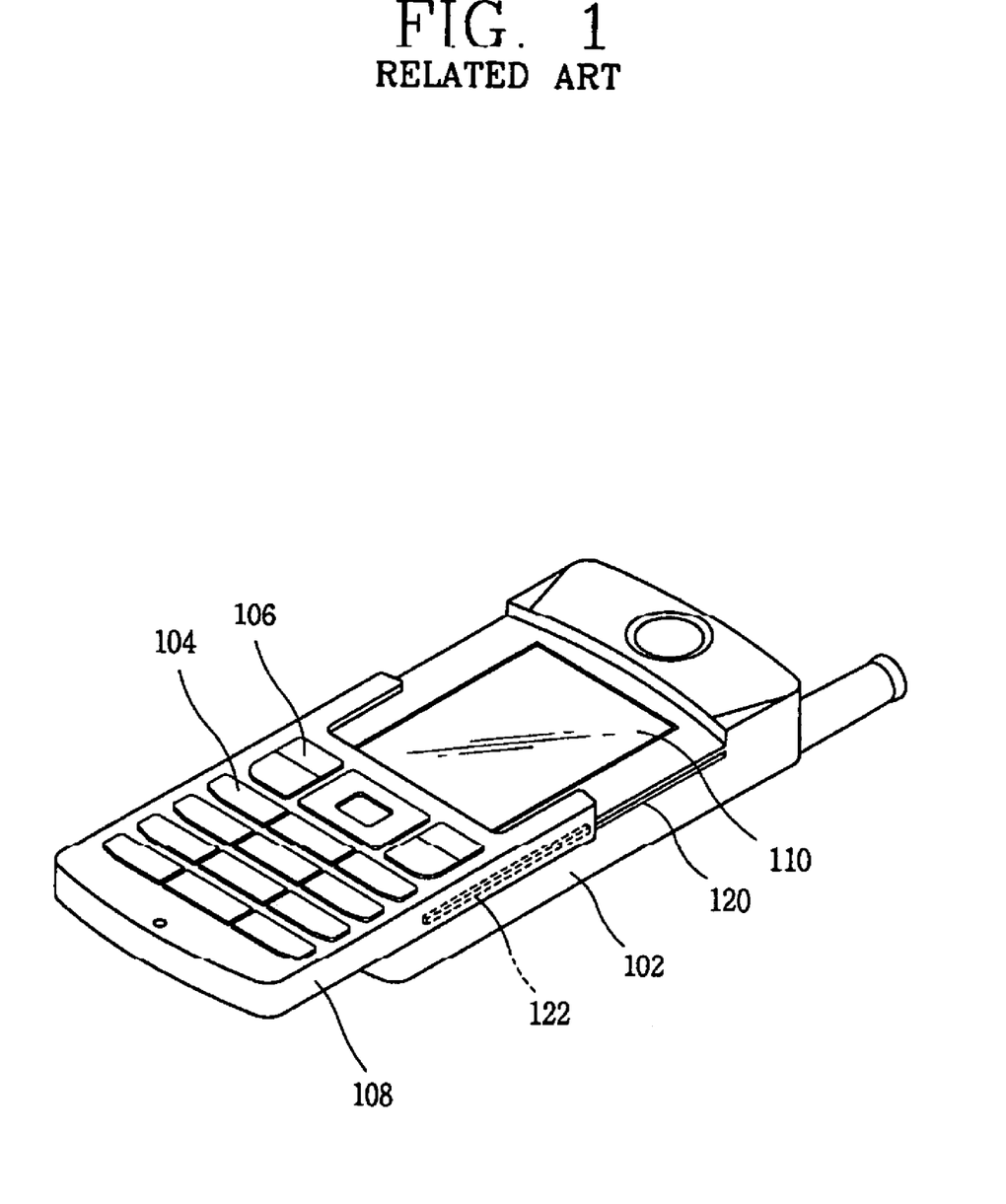
FIG. 1 is a perspective view illustrating a conventional slide type portable terminal.

Referring to FIG. 1, the slide type portable terminal comprises a first body 108 connected to the second body 102 and a second body 102 having a LCD 110 for displaying information. A menu button 106 and a dial button 104 are disposed on a front surface of the first body 108.

A guide groove 120 is a slide unit for the second body 102. The guide groove 120 is formed along lateral surfaces of the second body 102. The guide groove 120 is positioned along a slide direction. A glide rail 122 is a slide unit for the first body 108. The guide rail 122 is formed along both edges of the first body 108 for insertion into the guide groove 120. The guide rail 122 inserts into the guide groove 120. The first body 108 slides relative to the second body 102. A user of the slide type terminal manually slides the second body 102 along one direction to expose the first body 108 and along an opposite direction for hiding the second body 102. This manual sliding to open and close the terminal causes inconvenience to a user.

Korean Laid Open Publication No. 2002-0014431 discloses a slide type terminal that requires components such as a gear, a rack, and an elastic spring to slide a first portion of the terminal over a second portion of the terminal. These additional components significantly increase complexity and size of the portable terminal. The elastic spring, over repeated uses, may degrade causing inaccurate operation of the portable terminal.

Therefore, there is a need for a slide type portable terminal that overcomes the above problems and provides advantages over other systems.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention provides a slide type portable terminal of a simplified structure reducing fabrication cost, minimizing terminal size, and providing substantially automatic opening and closing of the mobile terminal. The automatic or substantially automatic opening and closing of the mobile terminal involves a magnetic driving force. A first body opens and closes by a magnetic driving force produced between the first body and a second body.

In one embodiment, a portable terminal is provided comprising a first body removably attached to a second body, and a magnetic mechanism for adjusting a relative position of the first body to the second body. The first body applies a magnetic driving force to the second body, when the first body is in an open position in relation to the second body.

The terminal further comprises a locking unit for locking the first body upon the relative position of the first body and the second body being in a closed position. The first body further comprises a sliding guide on one of the first body and the second body, and on the other body a mating surface for connecting tongue and groove to the sliding guide.

In another embodiment, a slide type portable terminal is provided comprising a first body slidably mounted to a second body in a slide direction, wherein the first body slidably mounted provides a magnetic mechanism when the first body is in at least one of opened or closed position in relation to the second body. The magnetic mechanism provided comprises a fixed magnet mounted at the upper surface of the second body in a slide direction. A first movable magnet is mounted at the lower surface of the first body in a slide direction and arranged to have an opposite polarity to the fixed magnet providing a magnetic driving force between the fixed magnet and thereby automatically opening the first body. In another example, the magnetic mechanism is provided comprising a second movable magnet mounted with a certain interval from the first movable magnet for generating a magnetic driving force between the fixed magnet and thereby automatically closing the first body.

In one embodiment, the method further comprises removably attaching a first body to a second body, adjusting a relative position of the first body to the second body, and providing a magnetic driving force from the first body to the second body when the relative position between the first body and the second body is an open position. The method is provided comprising locking the first body utilizing a locking unit upon the relative position of the first body and the second body being in a closed position.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments.

The invention will be described in detail with reference to the following drawings in which like reference numerals refer to like elements wherein.

DETAILED DESCRIPTION OF THE PREFERRED EMBODIMENTS

The present invention relates to a system and method for a portable terminal. The invention relates to a first body removably attached to a second body, and a magnetic mechanism for adjusting a relative position of the first body to the second body.

The present invention provides a movable magnet installed at the first body and the fixed magnet is installed at the second body. A magnetic attraction between the magnets provides the convenience of automatically or substantially automatically opening or closing the first body from the second body of the terminal based on a user input. The present invention provides a magnetic driving force for placing the first body in an open or close position allowing repeatable, precision operation even after multiple usages.

The present invention reduces the component count and overall terminal size because the magnets may be thin to produce a dimensionally reduced size portable terminal.

Although the invention is illustrated with respect to mobile terminal, it is contemplated that the invention may be utilized anywhere it is desired for transmitting, receiving, or processing signals. Reference will now be made in detail to the preferred embodiments of the present invention, examples of which are illustrated in the accompanying drawings.

Figure 2:
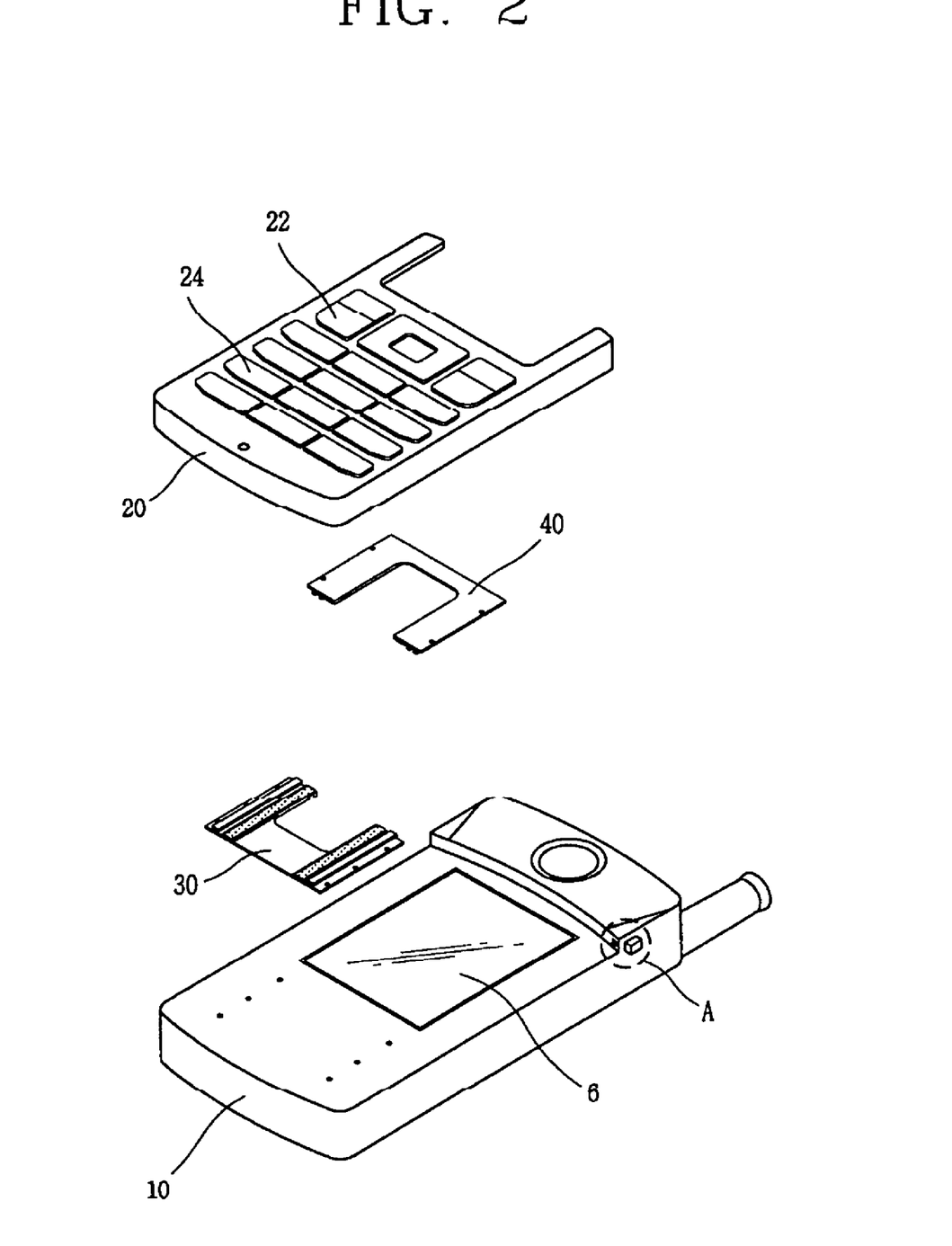
FIG. 2 is a disassembled perspective view illustrating a slide type portable terminal according to one embodiment of the present invention.

Referring to FIG. 2, the mobile terminal comprises a second body 10 to which an LCD 6 for displaying information is attached. The second body 10, in this example, has a printed circuit board (PCB) for mounting circuit components. A first body 20 slidably mounts to the upper surface of the second body 10 along a slide direction. A menu button 22 and a dial button 24 are disposed on the first body 20. A first open and close unit 30 and a second open and close unit 40 are disposed between the first body 20 and the second body 10. The first open and close unit or first slide unit 30 and the second open and close unit or second slide unit 40 provides guides for the first body 20 to be slidably moved along the second body 10 and forces by which the first body 20 automatically or substantially automatically moves.

Figure 3A:
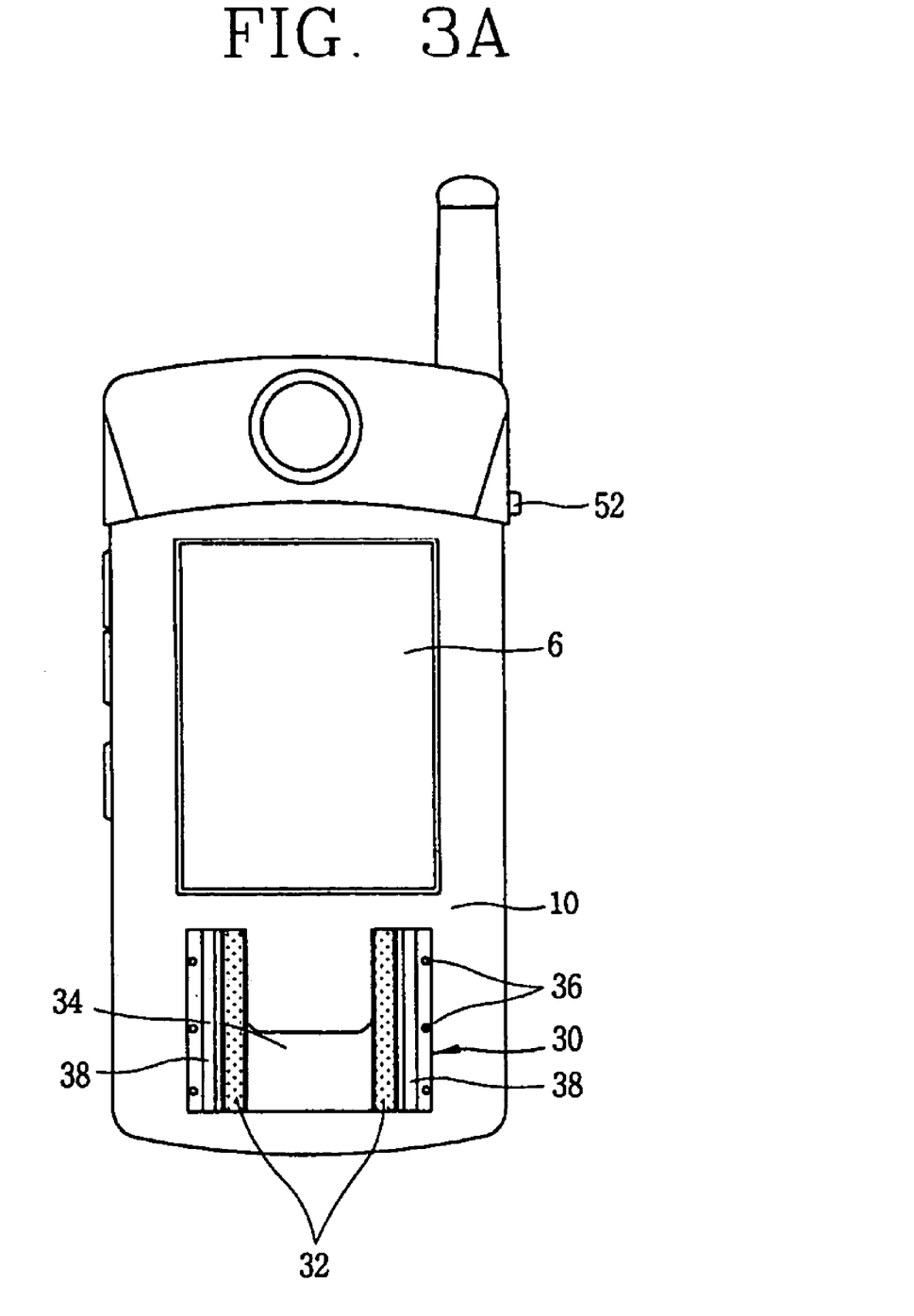
FIG. 3A is a frontal view of a second body of the portable terminal according to one embodiment of the invention.

Referring to FIG. 3A, the first slide unit 30 comprises a first frame 34, a first magnet 32, and guide rails 38. The first frame 34 mounts on the upper surface of the second body 10. The first frame 34 provides a plurality of coupling holes 36 for coupling to the upper surface of the second body 10. The first magnet 32, which in this example is a fixed magnet, mounts on the first frame 34 in a slide direction. Alternatively, the first magnet 32 may comprise two or more magnets. The guide rails 38 protrude by a chosen width, for example, along sides of the first frame 34 in a slide direction of the first body 20. In the alternative, the guide rails 38 may be replaced by a glide mechanism. The glide mechanism, in one example, is one guide rail or, yet in another example, multiple guide rails.

Figure 3B:
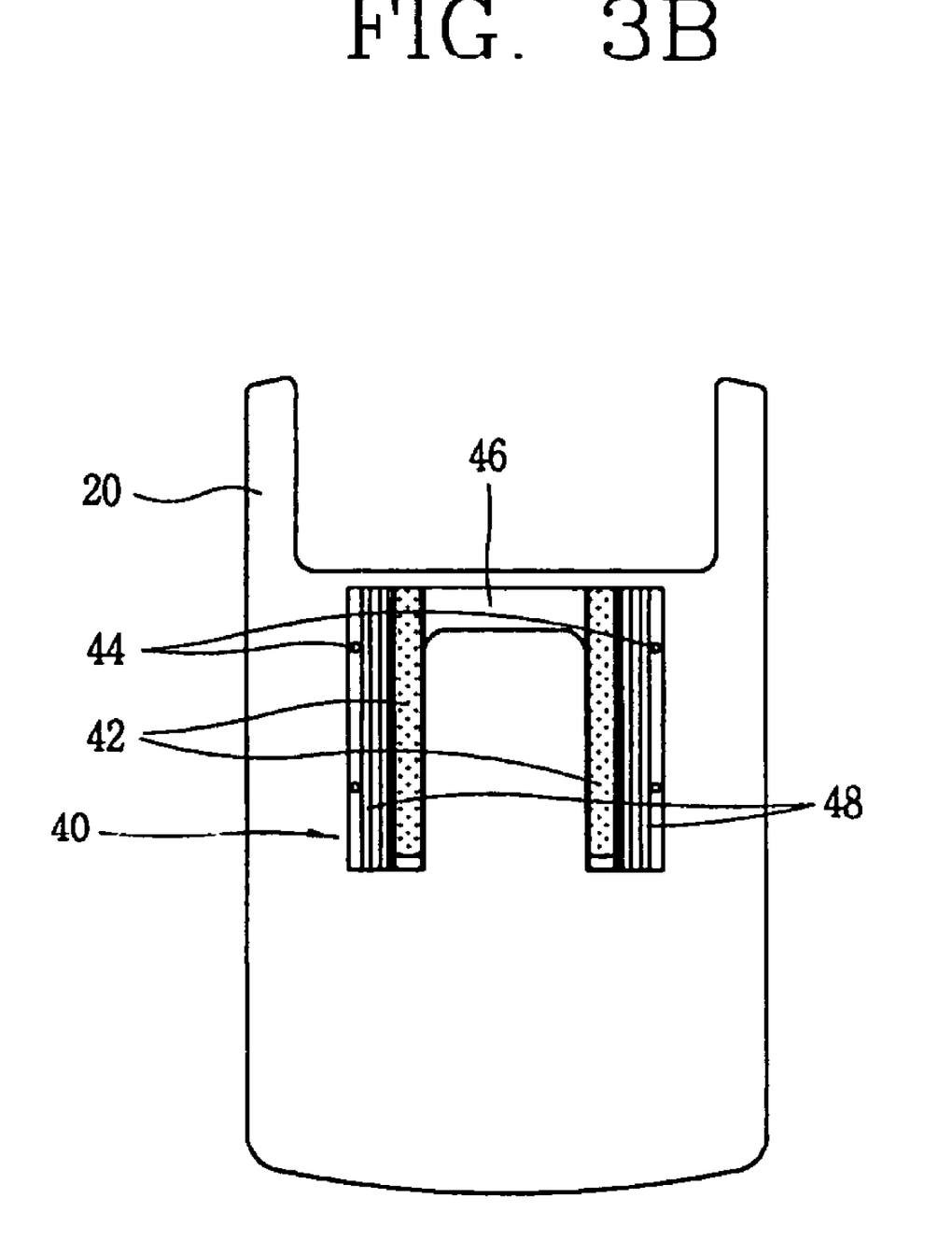
FIG. 3B is a frontal view illustrating a first body of the portable terminal according to one embodiment of the invention.

Referring to FIG. 3B, the second slide unit 40 mounts at the lower surface of the first body 20. The second slide unit 40 comprises a second frame 46 mounted at the lower surface of the first body 20. The second frame 46 has guide grooves 48 slidably adapted to mate with the guide rails 38. A second magnet 42, in this example a movable magnet, is mounted along the second frame 46 in a slide direction. The second magnet 42 is positioned having an opposing polarity to that of the first magnet 32 (see FIG. 3A).

Figure 4:
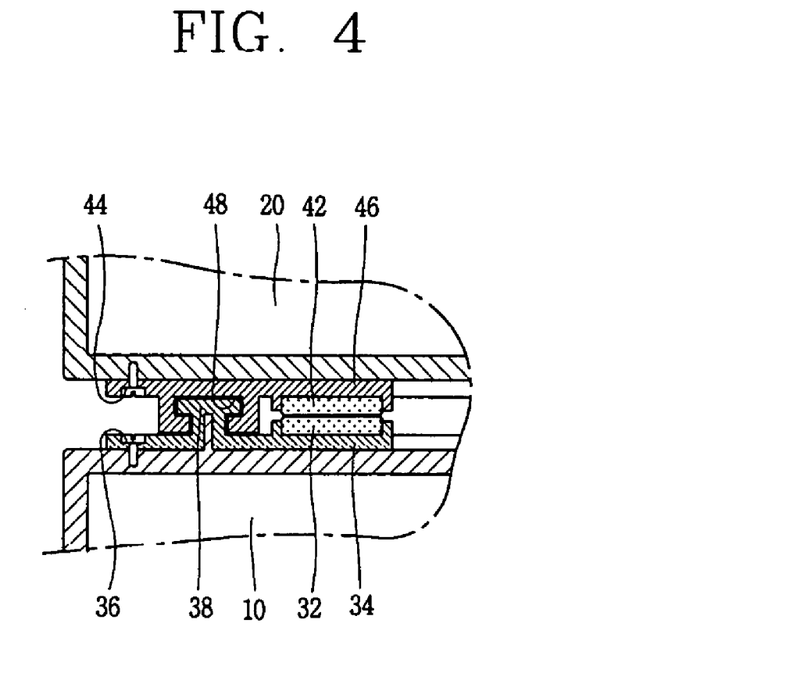
FIG. 4 is a partial section view illustrating the first body and the second body of the portable terminal according to one embodiment of the invention.

Referring to FIG. 4, a plurality of coupling holes 44 are formed at both lateral surfaces of the second frame 46 for coupling to the first body 20. The guide rails 38 fits into the guide grooves 48 for slidably moving the first body 20. The first magnet 32 and the second magnet 42 produce a magnetic driving force in a direction in which the first body 20 is open. A second magnet 42, in this example a movable magnet, attaches to the sides of the second slide unit 40.

Assembly of the mobile or portable terminal comprises the first frame 34 being bolted or coupled to the upper surface of the second body 10. Similar to the first frame 34 attachment to the mobile terminal, the second frame 46 is bolted or coupled to the first body 20. The guide rails 38 formed along the first frame 34 are fitted into the guide grooves 48 completing the assembly between the first body 20 and the second body 10.

Figure 5:
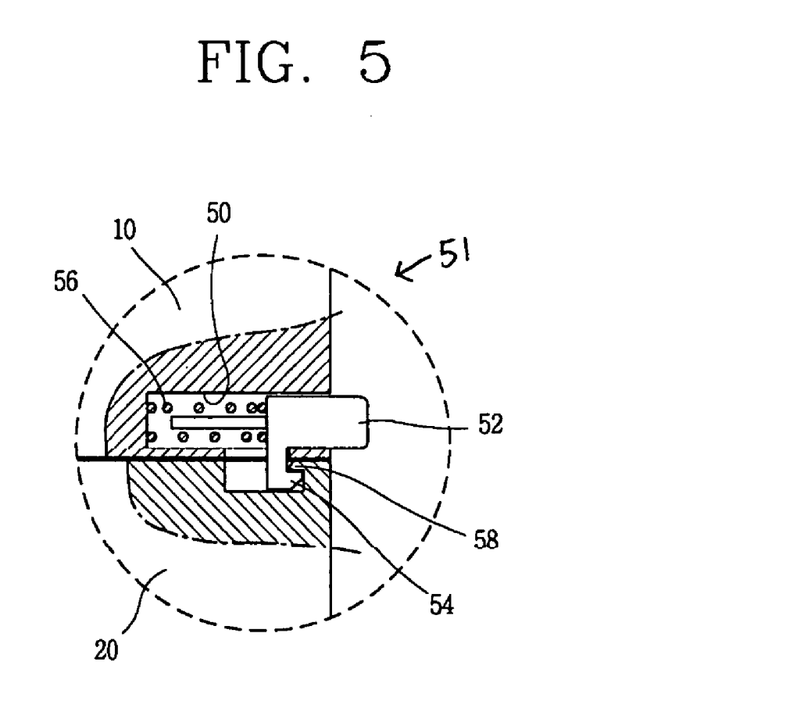
FIG. 5 is an enlargement section view of 'A' part of FIG. 2 in accordance with one embodiment.

Referring to FIG. 5, a locking unit 51 locks the first body 20 to the second body unit 10. The locking unit 51 limits a slide motion of the first body 20 along the second body 10 in a closed position. The locking unit 51 comprises a push button 52, a locking hook 54, a locking groove 58, and a spring 56. The push button 52 is inserted into an insertion groove 50 formed at one side of the second body 10. The insertion groove has one side accessible for a user to press. The locking hook 54, in this example, is integrally formed at the push button 52. The spring 56 is installed between another side of the push button 52 and the second body 10. The spring 56 provides an elastic force to the push button 52. The locking groove 58 is integrally formed on the upper side of the first body 20 and adapted to mate with the locking hook 54. When the first body 20 is closed, the locking hook 54 attaches to the locking groove 58 formed at the first body 20. A user presses the push button 52, the locking hook 54 detaches from the locking groove 58. The first body 20 is released from the second body 10.

Figure 6A:
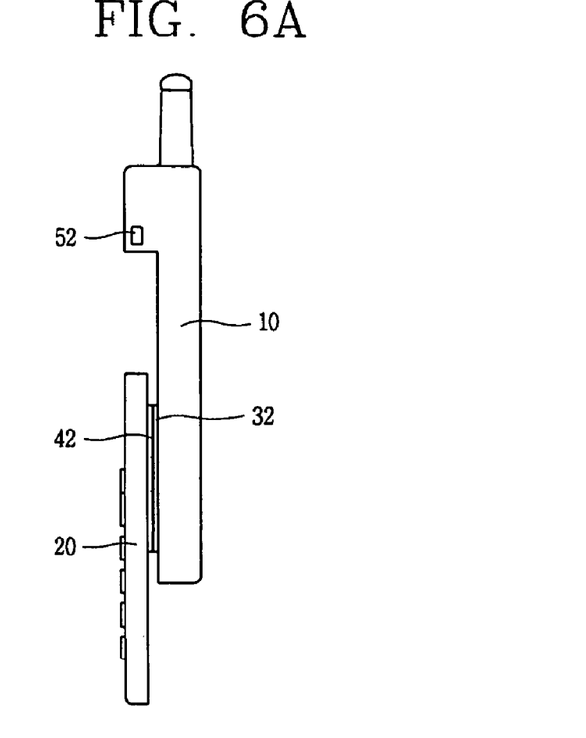
FIG. 6A and FIG. 6B are operational state views of the portable terminal according to one embodiment of the invention.

Referring to FIG. 6A, a user presses a push button 52 to open the first body 20 to use the portable terminal. The locking hook 54 is detached from the locking groove 58 formed at the second body 10 to release the locking of the first body 20. A magnetic force produces an attractive force between the first magnet 32 and the second magnet 42. The attractive force provides a driving force by which the first body 20 opens, thereby assisting a user, automatically, or substantially automatically placing the first body 20 in an open position.

If the first body is closed, an upper end of the first magnet 32 and a lower end of the second magnet 42 overlap, thereby coupling to with each other, over a desired width. An attractive force generated between the magnets 32 and 42 is applied along a direction that the first body 20 is open. Upon releasing the first body 20 from a locked position, the first body 20 opens automatically or substantially automatically. When the first body 20 is open, the second magnet 42 and the first magnet 32 are positioned face to face.

Figure 6B:
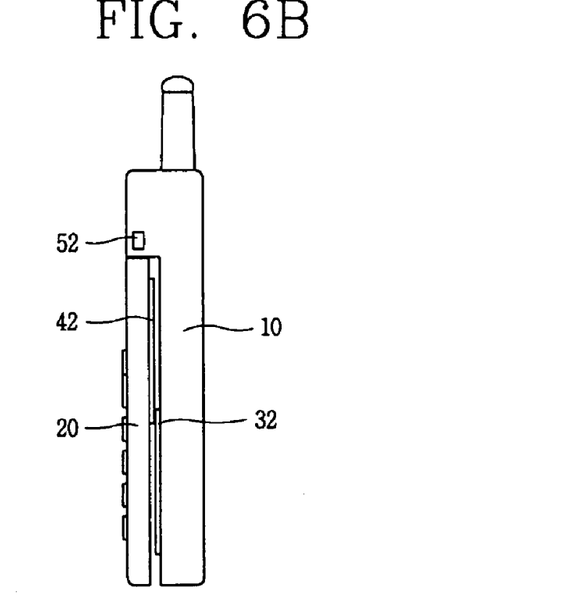

Referring to FIG. 6B, for placing the first body 20 in a closed or locked position, a user pushes the first body 20 toward the second body 10. The locking groove 58 attaches and locks to the locking hook 54.

Figure 7:
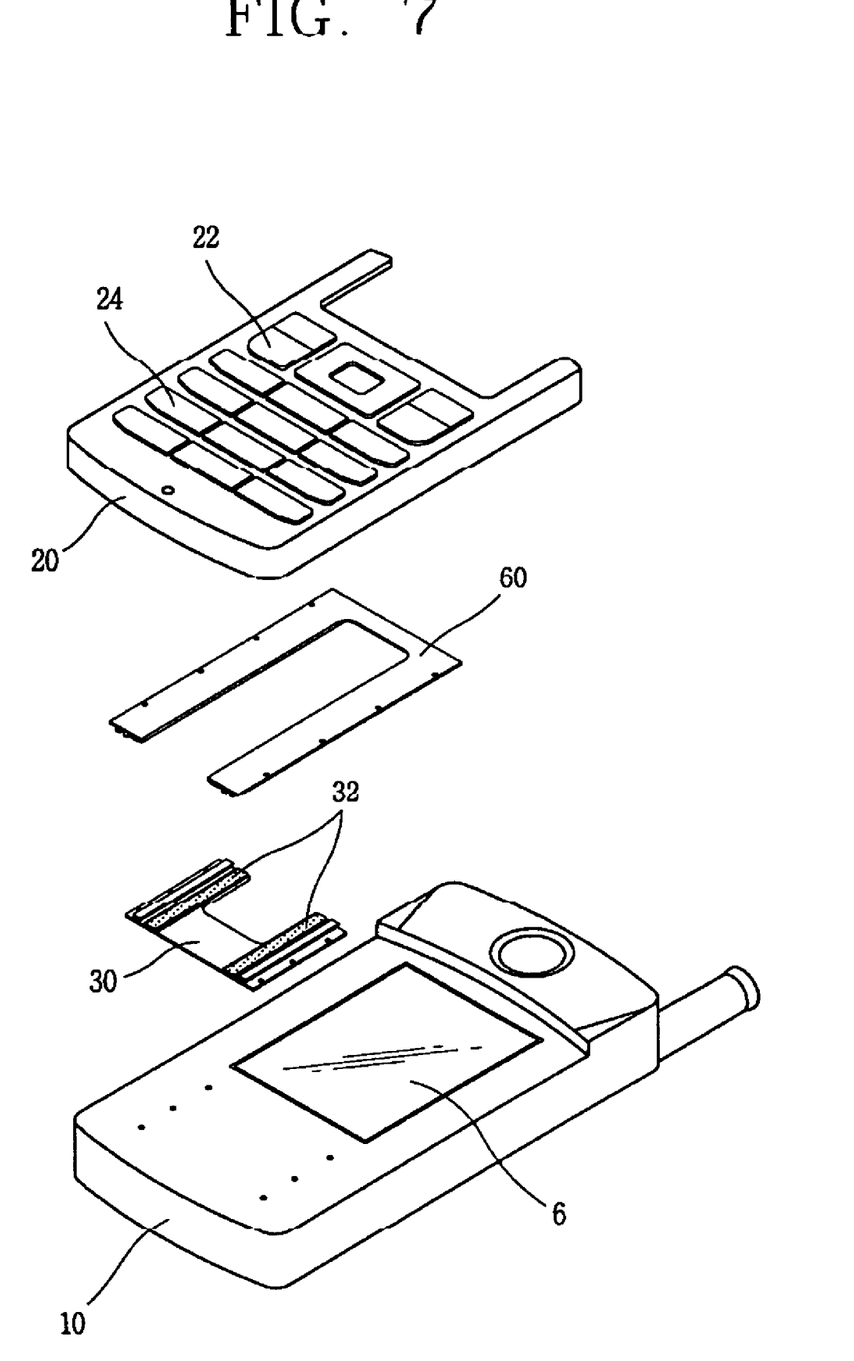
FIG. 7 is a disassembled perspective view illustrating a portable terminal according to an embodiment of the invention.

Referring to FIG. 7, a first slide unit 30 mounts on an upper surface of the second body 10. The first magnet 32, in this example a fixed magnet, attaches to the first slide unit 30. The first slide unit 30 is as illustrated and described above in FIG. 3A. In summary, the first slide unit 30 comprises a first frame 34 mounted at the upper surface of the second body 10. The first frame 34 has a plurality of coupling holes 36 for bolting or screwing to the second body 10. A first magnet 32, in this example a fixed magnet, mounts to the first frame 34 along a slide direction. A guide rails 38 protrudes with a certain width at both sides of the first frame 34 along a slide direction.

Figure 8:
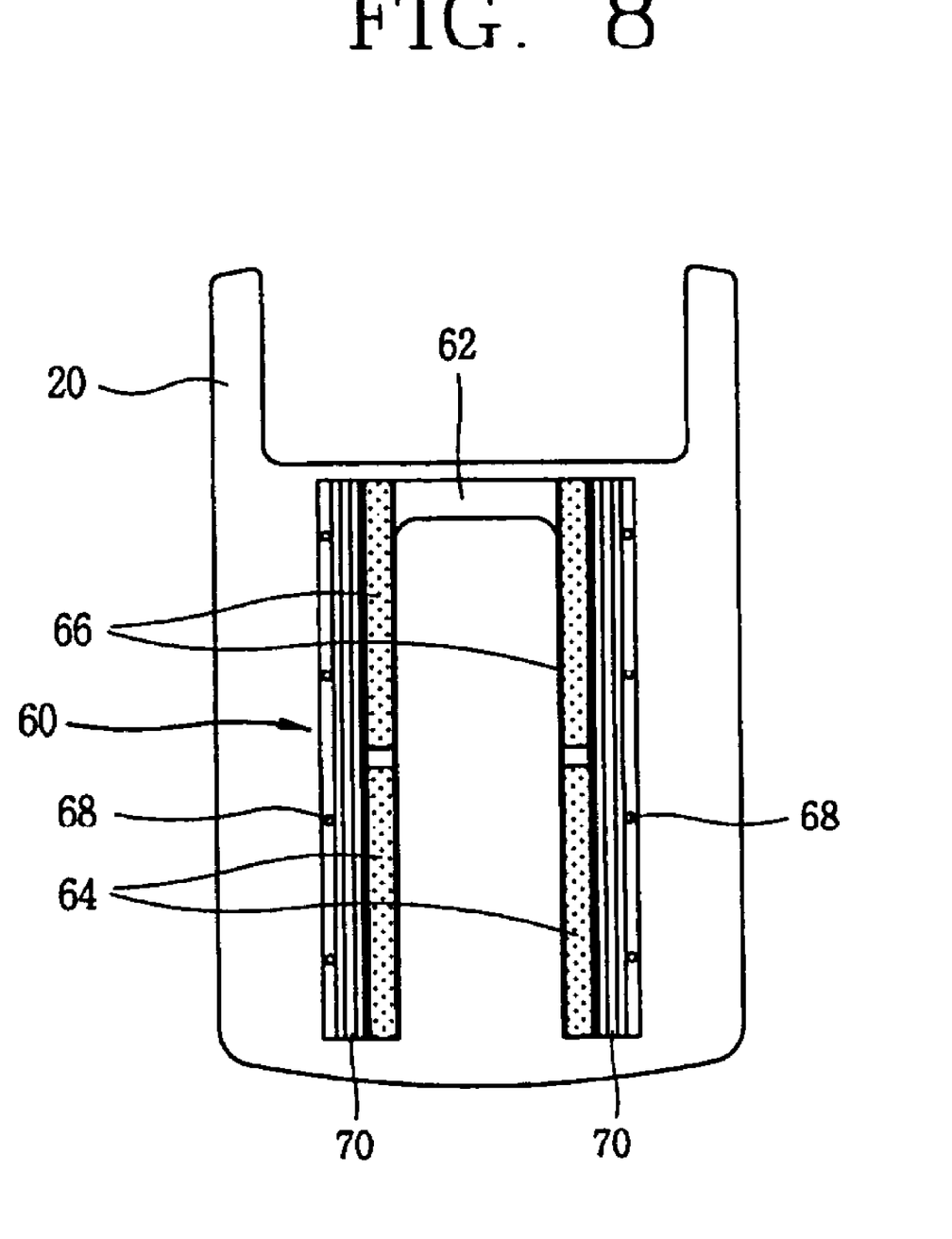
FIG. 8 is a frontal view showing a second body of the portable terminal according to an embodiment of the invention.

Referring to FIG. 8, a second slide unit 60 mounts at a lower surface of the first body 20. A first movable magnet 64 and a second movable magnet 66 attach to the second slide unit 60. The first movable magnet 64 and the second magnet 66 couple with the first magnet 32.

The second slide unit 60 comprises a second frame 62 mounted on a lower surface of the first body 20. A first movable magnet 64 is mounted, in this example as a pair of magnets, along the sides of the second frame 62 along a slide direction. The first movable magnet 64 is positioned to have an opposite polarity of that of the first magnet 32. The second movable magnet 66 is also constructed as a pair mounted at both sides of the second frame 62, and is positioned in-line with the first movable magnet 64. A magnetic force is generated between the first magnet 32 and the first movable magnet 64. The magnetic force provides a driving force in a direction of positioning the first body 20 in a closed position.

A second movable magnet 66 mounts to a lower surface of the first body 20. The second movable magnet 66 is positioned in an opposite polarity to the first magnet 32. The second movable magnet 66 generates a magnetic force between the fixed magnet 32 to provide a magnetic driving force for moving the first body 20 to an open position.

The second frame 62 is positioned at a lower surface of the first body 20 along a slide direction. The second frame comprises a plurality of coupling holes 68 at both lateral surfaces. The second frame 62 is bolted or coupled though the plurality of coupling holes along a slide direction to the first body 20. The guide rails 38 of the first body 10 are inserted into and glide within a guide groove 70 in the second frame 62 for guiding of the first body 20.

Figure 9A:
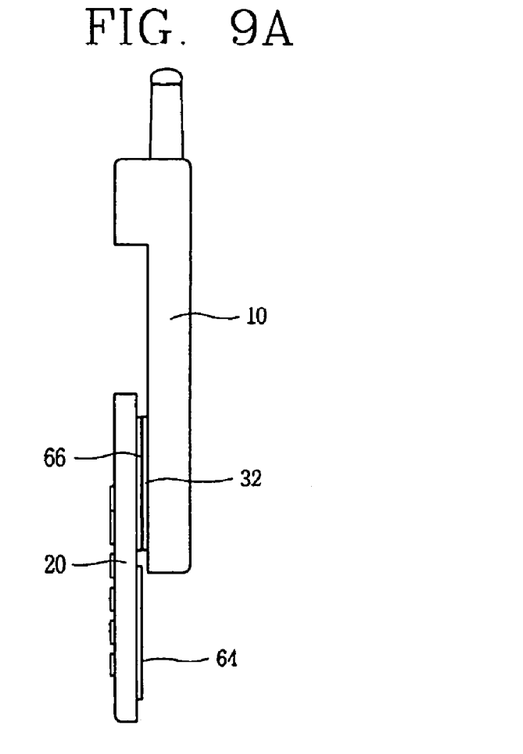
FIG. 9A and FIG. 9B are operational state views of the portable terminal according to an embodiment of the invention.

Referring to FIG. 9A, a user pushes the first body 20 along a direction of an open position for using the portable terminal. The first movable magnet 66 magnet is moved to an overlapping position with the first magnet 32. A magnetic force producing an attractive force is generated between the first movable magnet 66 and the first magnet 32. The attractive force provides a magnetic driving force to place the first body 20 in an open position. The magnetic driving force positions the first body in an open position.

Figure 9B:
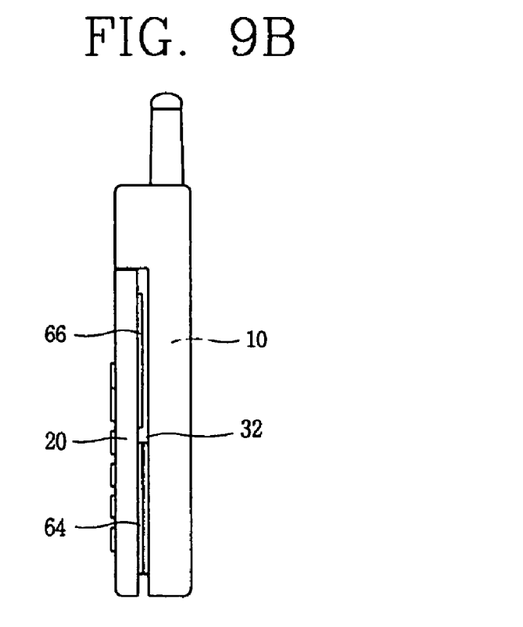

Referring to FIG. 9B, when a user pushes the first body 20 along a direction of a closed position. The fixed magnet 32 is moved from the first movable magnet 66 to an overlapping position with the second movable magnet 64. An attractive force is generated between the fixed magnet 32 and the second movable magnet 64 providing a driving force to place the first body 20 in a closed position. The magnetic driving force automatically closes the first body 20.

Figure 10:
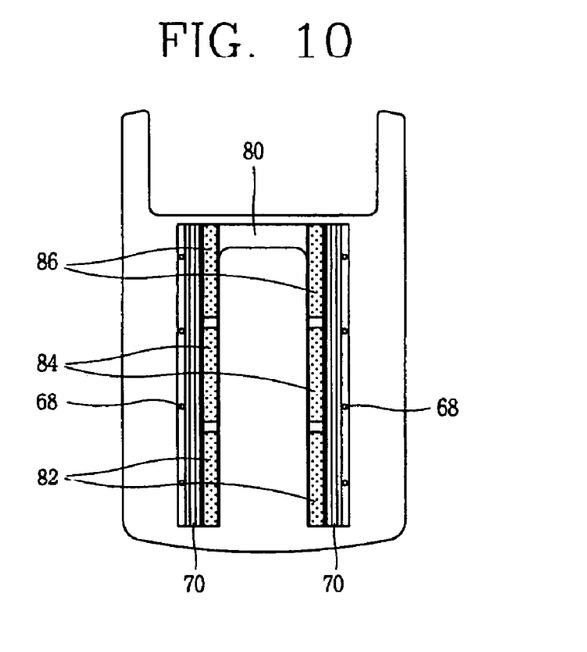
FIG. 10 is a frontal view illustrating a second body of a portable terminal according to an embodiment of the invention.

Referring to FIG. 10, the sliding unit produces a free stop type portable terminal capable of stopping the first body 20 at a user's desired position. In this example a plurality of magnets, not less than two, are positioned along a lower surface of the first body 20.

The sliding unit comprises the first magnet 32 attached to a first frame 34 mounted on an upper surface of the second body 10 along a slide direction. Movable magnets 82, 84, and 86 are attached at a user chosen interval to a second frame 80 mounted along a lower surface of the first body 20 of a slide direction. Three movable magnets, in one example, comprise a first movable magnet 82 arranged at a lower side of the first body 20 in a slide direction for generating a magnetic force between the first magnet 32. The magnetic force provides a driving force to the first body 20 when the first body 20 is open. In the same example, a second movable magnet 84 positioned in the middle of the first body 20 generates a magnetic force between the first magnet 32. The magnetic force provides a driving force to place the first body 20 when in a middle position in an open position. In this same example, a third movable magnet 86 located on the upper side of the first body 20 provides a driving force when the first body is closed.

Figure 11A:
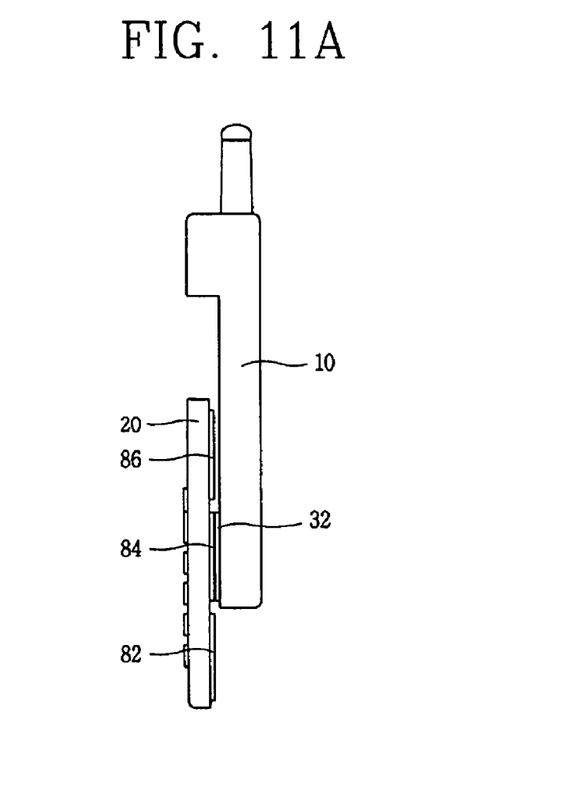
FIG. 11A, FIG. 11B, and FIG. 11C are operational state views of the portable terminal according to an embodiment of the invention.
Figure 11B:
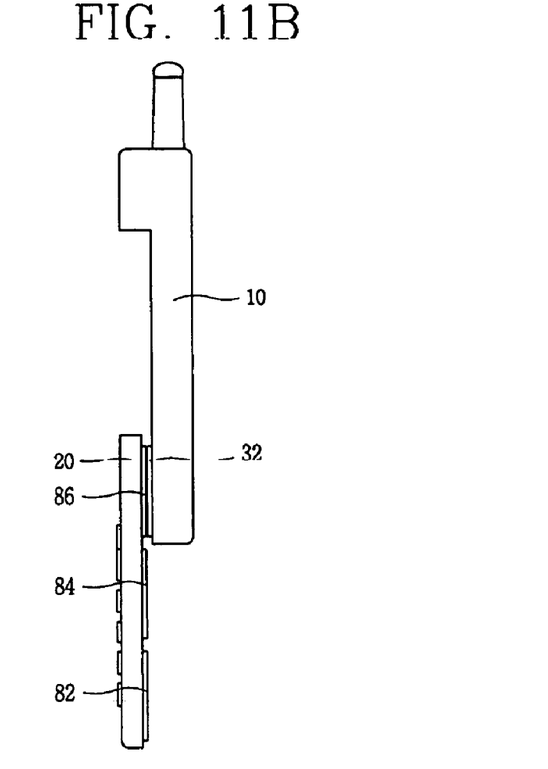
Figure 11C:
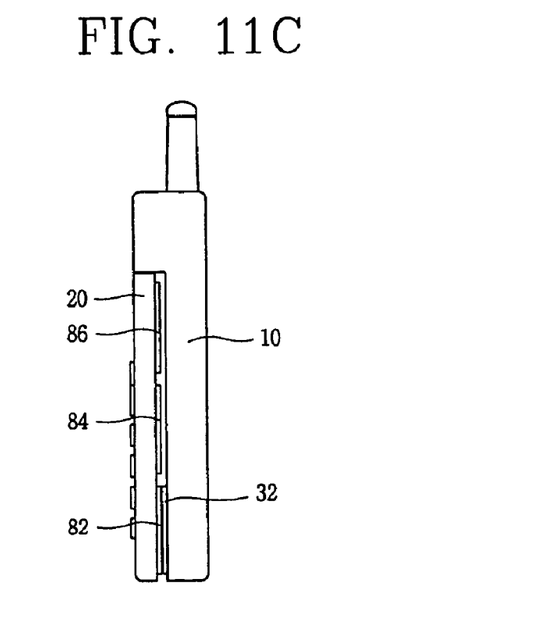

Referring to FIG. 11A, when a user pushes the first body 20 along an open direction, a magnetic force is generated between the first magnet 32 and the second movable magnet 84. The first body 20 is automatically in an open position in the middle position. Referring to FIG. 11B, when a user pushes the first body 20 in an open direction, a magnetic force is generated between the first magnet 32 and the first movable magnet 82. The first body 20 is placed in a maximum open position. Referring to FIG. 11C, a user pushes the first body 20 toward a closed position after using the portable terminal. A magnetic force is generated between the first magnet 32 and the third movable magnet 86. The magnetic force causes the first body 20 to automatically close.

Although the present invention is described in the context of a mobile terminal, the present invention may also be used in any wired or wireless communication systems using mobile devices, such as PDAs and laptop computers equipped with wired and wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, system or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention. Further, with respect to the claims, it should be understood that any of the claims described below may be combined for the purposes of the present invention.

The foregoing embodiments and advantages are merely exemplary and are not to be construed as limiting the present invention. The present teaching can be readily applied to other types of systems. The description of the present invention is intended to be illustrative, and not to limit the scope of the claims. Many alternatives, modifications, and variations will be apparent to those skilled in the art. Accordingly, the invention is not limited to the precise embodiments described in detail hereinabove.

What is claimed is:

1. A portable terminal, comprising:
   a first body removably attached to a second body, wherein the first body is positionable between open and closed positions relative to the second body;
   a first magnet located on a lower side of the first body; and
   a second magnet located on an upper side of the second body, the second magnet located effectively adjacent to the first magnet when the first body is in the closed position, the first and second magnets for providing a driving force that causes the first body to move from the closed position.

2. The terminal of claim 1, further comprising:
   a locking unit for locking the first body to the second body when the first body is in the closed position.

3. The terminal of claim 2, wherein the locking unit comprises:
   a push button movably insertable into an insertion groove formed in one side of the second body, the push button having one side exposed to an outer surface of the second body;
   a locking hook integrally formed at the push button;
   a spring installed between another side of the push button and the second body for providing an elastic force to the push button; and
   a locking groove formed at the first body for locking to the locking hook on the second body.

4. The terminal of claim 1, further comprising:
   a sliding guide on one of the first body and the second body, and on another one of the first body and the second body, a mating surface for connecting tongue and groove to the sliding guide.

5. The terminal of claim 1, wherein the first magnet is mounted to a frame located on lower side of the first body, and wherein the frame comprises at least one guide rail arranged along a slide direction of the first body.

6. The terminal of claim 1, wherein the second magnet is mounted to a frame located on the upper side of the second body, wherein the frame comprises at least one guide groove arranged along a slide direction of the second body.

7. The terminal of claim 1, wherein the first magnet is mounted to a first frame located on the lower side of the first body, and the second magnet is mounted to a second frame located on the upper side of the second body,
   wherein the second frame comprises at least one guide groove arranged along a slide direction of the second body, and
   wherein the first frame comprises at least one guide mechanism arranged along a slide direction of the first body for mating with the at least one guide groove of the second body.

8. The terminal of claim 7, wherein the at least one guide mechanism comprises two guide rails aligned along opposing sides of the first frame.

9. The terminal of claim 1, wherein the first magnet and the second magnet are positioned so that they have opposite polarity.

10. The terminal of claim 9, wherein the second magnet is a fixed magnet and the first magnet is a movable magnet.

11. The terminal of claim 1, further comprising:
    an LCD display located on the second body.

12. The terminal of claim 1, further comprising:
    a menu button located on an upper side of the first body.

13. The terminal of claim 1, further comprising:
    a dial button located on an upper side of the first body.

14. A slide type portable terminal, comprising:
    a first body slidably attached to a second body, wherein the first body is positionable between open and closed positions relative to the second body;
    a first magnet located on a lower side of the first body; and
    a second magnet located on an upper side of the second body, the second magnet located effectively adjacent to the first magnet when the first body is in the closed position, the first and second magnets for providing a driving force that causes the first body to move from the closed position.

15. The terminal of claim 14, wherein the first magnet is a movable magnet, and the second magnet is a fixed magnet arranged to have an opposite polarity to the first magnet.

16. The terminal of claim 15, wherein the first magnet is mounted to a frame located on the lower side of the first body, wherein the frame comprises at least one guide rail arranged along a slide direction of the first body.

17. The terminal of claim 16, wherein the second magnet is mounted to a second frame located on an upper side of the second body, wherein the frame comprises at least one guide groove arranged along a slide direction of the second body.

18. The terminal of claim 14, wherein the first magnet is laterally aligned along sides of a first frame.

19. The terminal of claim 14, further comprising:
at least two additional magnets located on the lower side of the first body within a certain interval along the slide direction and opposite to the second magnet, the at least two additional magnets located to provide distinct adjustment intervals of the first body relative to the second body.

20. A slide type portable terminal, comprising:
a first body slidably mounted to a second body, the first body being variably positionable relative to the second body;
a magnetic mechanism coupled to the first body and cooperating with the second body for slidably positioning the first body relative to the second body, the magnetic mechanism comprising:
    a first magnet arranged on a lower portion of the first body;
    a second magnet arranged along a middle portion of the first body; and
    a third magnet arranged along an upper portion of the first body, wherein the first, second, and third magnets cooperate with the second body to provide intervals for adjusting position of the first body relative to the second body.

21. The terminal of claim 20, further comprising:
a fourth magnet located on the second body and cooperating with each of the first, second, and third magnets to provide the adjusting position of the first body relative to the second body.

22. A method for producing a sliding portable terminal, the method comprising:
removably attaching a first body to a second body in a manner which permits the first body to be positionable between open and closed positions relative to the second body;
locating a first magnet on a lower side of the first body; and
locating a second magnet on an upper side of the second body, the second magnet located effectively adjacent to the first magnet when the first body is in the closed position, the first and second magnets for providing a driving force that causes the first body to move from the closed position.

23. The terminal of claim 22, further comprising:
providing a locking unit for locking the first body to the second body when the first body is in the closed position.

24. The terminal of claim 22, further comprising:
providing a sliding guide on one of the first body and the second body, and on another one of the first body and the second body, providing a mating surface for connecting tongue and groove to the sliding guide.

25. The terminal of claim 22, further comprising:
mounting the first magnet to a frame located on an upper side of the first body, wherein the frame comprises at least one guide rail arranged along a slide direction of the first body.

26. The terminal of claim 22, further comprising:
mounting the second magnet to a frame located on an upper side of the second body, wherein the frame comprises at least one guide groove arranged along a slide direction of the second body.

27. The terminal of claim 22, further comprising:
positioning an LCD display on the second body.

28. The terminal of claim 22, further comprising:
positioning a menu button on an upper side of the first body.

29. The terminal of claim 22, further comprising:
positioning a dial button on an upper side of the first body.

30. A portable terminal, comprising:
a first body structured to slidably couple with a terminal body, wherein the first body comprises a keypad;
a first magnet mounted on an upper portion of a lower side of the first body;
a second magnet mounted on a lower portion of the lower side of the first body; and
a third magnet mounted to an upper side of the terminal body, wherein the first magnet is structured to magnetically couple to the third magnet when the first body is in an open position, and the second magnet is structured to magnetically couple to said third magnet when the first body is in a closed position.

31. The terminal of claim 30, wherein the terminal body comprises a display.

* * * * *